United States Patent [19]
Kobayashi

[11] 4,204,760
[45] May 27, 1980

[54] FOCUS ADJUSTING DEVICE FOR SELF-CONTAINED INTERCHANGEABLE LENS CAMERA

[75] Inventor: Haro Kobayashi, Toyokawa, Japan

[73] Assignee: Minolta Camera Kabushiki Kaisha, Osaka, Japan

[21] Appl. No.: 968,953

[22] Filed: Dec. 13, 1978

[30] Foreign Application Priority Data

Dec. 15, 1977 [JP] Japan .................. 52-169323[U]

[51] Int. Cl.$^2$ ........................... G03B 3/00; G03B 3/02
[52] U.S. Cl. .................................................... 354/197
[58] Field of Search ........ 354/197, 195, 196, 198-201; 350/28, 247, 254

[56] References Cited

U.S. PATENT DOCUMENTS

| | | | |
|---|---|---|---|
| 1,178,478 | 4/1916 | Becker | 354/199 |
| 4,097,882 | 6/1978 | Engelsmann | 354/197 |
| 4,119,983 | 10/1978 | Tanaka | 354/222 X |

FOREIGN PATENT DOCUMENTS 2431600  1/1976  Fed. Rep. of Germany ........... 354/196

*Primary Examiner*—Richard A. Wintercorn
*Assistant Examiner*—Shelley Wade
*Attorney, Agent, or Firm*—Wolder, Gross & Yavner

[57] ABSTRACT

A self contained multiple interchangeable objective lens camera, having a photographic optical axis, includes first and second objective lenses which are movably carried within the camera for selective alternate positioning of one of the lenses in optical alignment with the camera optical axis. Each lens is movable between an operative photographic position when its longitudinal axis is substantially aligned with the camera optical axis and an inoperative position when its longitudinal axis is displaced from the camera optical axis. A driven member is carried by each of the objective lenses for effecting focusing adjustment. A manually operable distance setting member is carried by the camera. A control member, which is movable in response to movement of the distance setting member, carries first and second control portions which selectively engage the driven members of the first and second lenses respectively for controlling movement of the driven members to effect focusing of the lenses. A control surface, which lies in a plane parallel to the path of movement of the driven members when the lenses are moved between the operative and inoperative positions, is positioned between the control portions and the driven members. Accordingly when the lenses are interchanged, focusing adjustment will be effected by cooperation between the control portions of the control member and the driven members as result of interconnection between the distance setting member and the control member.

21 Claims, 5 Drawing Figures

FOCUS ADJUSTING DEVICE FOR SELF-CONTAINED INTERCHANGEABLE LENS CAMERA

BACKGROUND OF THE INVENTION

The present invention relates generally to cameras having self contained interchangeable photographic objective lenses which are alternatively selectively positionable in alignment with the optical axis of the camera, and more particularly to an improved focus adjusting device for use in such cameras.

Cameras have heretofore been available and proposed which are provided with multiple photographic objective lenses, each having different focal lengths, and which are built into and self contained in the camera for selective use in photographing depending upon the desired field of view. For example, such a camera may be provided with a separate telephoto lens and a standard objective lens, or may be provided with a separate telephoto lens and a wide angle objective lens. The different lenses may be alternately and selectively aligned with the optical axis of the camera to produce desired photographic effects.

In prior cameras of this type, the alternate lenses have typically been carried on a mounting plate slidable in a direction at right angles to the optical axis of the camera so that movement of the mounting plate in a direction transverse to the optical axis will position one of the lenses in optical alignment with the optical axis. Another type of arrangement provides for a plurality of lenses on a mounting disc supported on a pivot arranged parallel to the optical axis. Rotation of the disc will cause displacement of the lenses about the pivot for selective alignment with the optical axis.

In such cameras, each of the individual objective lenses carry a driven member which is externally movable in order to effect focusing adjustment of each such lens. In order to effect external movement of such driven members, the camera is usually provided with a control member which engages only the driven member of the particular objective lens which is selectively positioned in optical alignment with the optical axis of the camera. Such a control member is typically manually operable in order to effect desired focusing adjustment of the selected lens. In the prior cameras, however, the engaging surface between the control member and the driven member, along which the control member and driven members engage each other, lies in a plane which is transverse to the direction of movement of the objective lenses when they are moved for interchangeable positioning. This arrangement prevents accurate focusing of the selected lens upon movement to the operative position.

Prior U.S. Pat. No. 4,119,983, filed on Nov. 12, 1976 and issued on Oct. 10, 1978 is typical of such cameras. In this patent, a camera is disclosed in which a pair of photographic objective lenses of different focal lengths are supported by a V-shaped lever. The V-shaped lever is pivotally mounted on a shaft arranged vertical with respect to the camera photographic optical axis. When the V-shaped lever is externally pivoted to a desired angular position, the photographic objective lenses are moved in an arcuate path about the shaft for interchangeable alignment along the optical axis of the camera. These interchangeable photographic objective lenses are each provided with a driven member which is movable and always urged or biased to return to a predetermined initial position. Each of the photographic objective lenses may be focused to any desired object distance by movement of its respective driven member. Also provided inside the camera is a control member linked with a manually operable distance setting member and constructed to engage the driven member of the photographic objective lens which is selectively positioned in alignment with the camera photographic optical path. Formed at a portion of the control member is a control surface which lies in a plane transverse to the direction of movement of the driven members of the photographic objective lenses when they are displaced to be interchanged. The control surface of the control member engages the driven member of the selected lens when it is moved into alignment with the camera optical axis. Therefore, when the distance setting member is externally moved, the driven member of the selected objective lens is moved from its initial position by the control surface of the control member so that focusing adjustment of the selected lens is effected.

As noted above, the control surface of the control member in the prior device lies in a plane which extends transverse to the direction of movement of the driven members of the objective lenses. Therefore, if the objective lens which is moved to the selected position deviates to any slight degree from the photographic optical path of the camera, the driven member of that selected lens will engage a portion of the control member other than the desired engaging portion of the control surface. This will prevent accurate focusing adjustment of the selected lens.

While it might be possible to overcome this disadvantage by strictly controlling the amount of movement of the photographic objective lens and its position on the optical path, it is extremely difficult to hold the objective lenses precisely in predetermined positions when they are interchanged. Accordingly, in cameras of the type where multiple lenses are selectively movable between operative and inoperative positions, the engaging relation between the driven member on each lens and the control member, which is linked to the distance member, will vary each time the objective lenses are interchanged, thereby seriously inhibiting accurate focusing adjustment.

Another possible means of overcoming the disadvantages in the prior arrangement would be to provide means for firmly and precisely holding the selected objective lens in a position along the optical path of the camera. However, such a holding means would result in additional forces to resist movement of the various objective lenses from the operative to the inoperative positions. This would therefore greatly limit the ability to quickly and smoothly change lenses.

SUMMARY OF THE INVENTION

It is accordingly a principle object of the present invention to provide an improved focus adjustment device for cameras having a plurality of self contained interchangeable photographic objective lenses.

Another object of the present invention is to provide an improved focus adjustment device in a camera of the foregoing type which is capable of consistently accurate focusing adjustment of the objective lens which is selectively positioned in the optical path of the camera.

It is yet a further object of the present invention to provide an improved camera having multiple interchangeable lenses in which the focus adjusting mechanism requires no special means, such as control means, to control the positioning of the selected objective lens for accurate alignment with the optical axis of the camera in order to permit focusing adjustment by the focus adjusting mechanism.

It is a still further object of the present invention to provide a camera of the foregoing type which has a focus adjusting device which permits accurate focus adjustments without limiting the ability of the camera to quickly and smoothly interchange selected lenses.

The foregoing objects are generally accomplished by providing a self contained multiple interchangeable objective lens camera, having a photographic optical axis, which includes first and second objective lenses movably carried within the camera for interchangeable alignment with the optical axis, each of the lenses being movable between an operative photographic position when its respective axis is substantially aligned with the optical axis of the camera and an inoperative position when its axis is displaced from the camera optical axis, means interconnected between the first and second objective lenses for causing displacement of either one of the objective lenses from the operative position to the inoperative position in response to movement of the other objective lens from the inoperative to the operative position. A driven member is carried by each of the objective lenses for effecting focusing adjustment. An externally manually movable distance setting member is carried by the camera, and control means is mounted in the camera for movement in response to the movement of the distance setting chamber. First and second control portions carried by the control means are respectively engageable with the driven members of the first and second lenses for controlling movement of the driven members for focusing adjustment of the lenses. A control surface is located between the control portions and the driven members, each control surface lying in a plane parallel to the path of movement of the driven members when the lenses are displaced between the operative and inoperative positions.

Other objects, features and advantages of the present invention will become apparent from the description of the invention in connection with the accompanying drawings described more fully hereinafter.

DESCRIPTION OF THE PREFERRED EMBODIMENT

Figure 1:
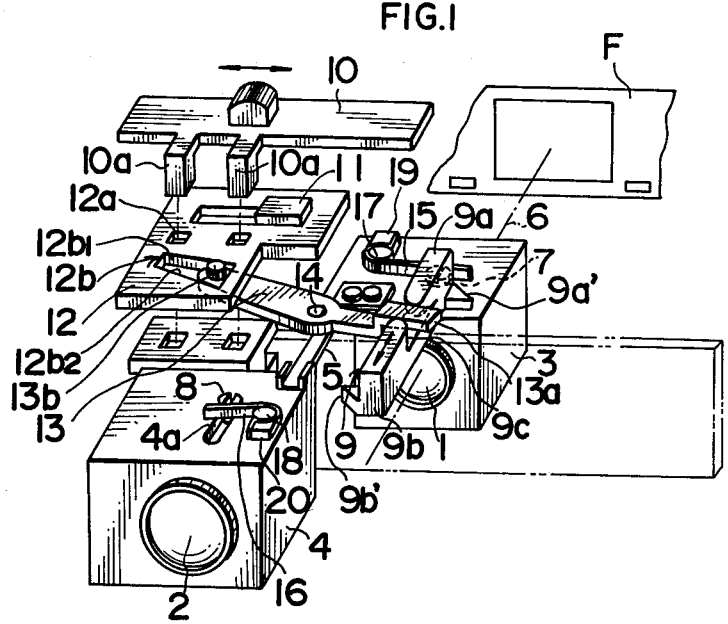
FIG. 1 is a partially exploded perspective view of a first embodiment of the present invention illustrating the positioning of the various elements of the invention when a standard objective lens is in the operative selected position having its longitudinal axis aligned with the optical axis of the camera.
Figure 2:
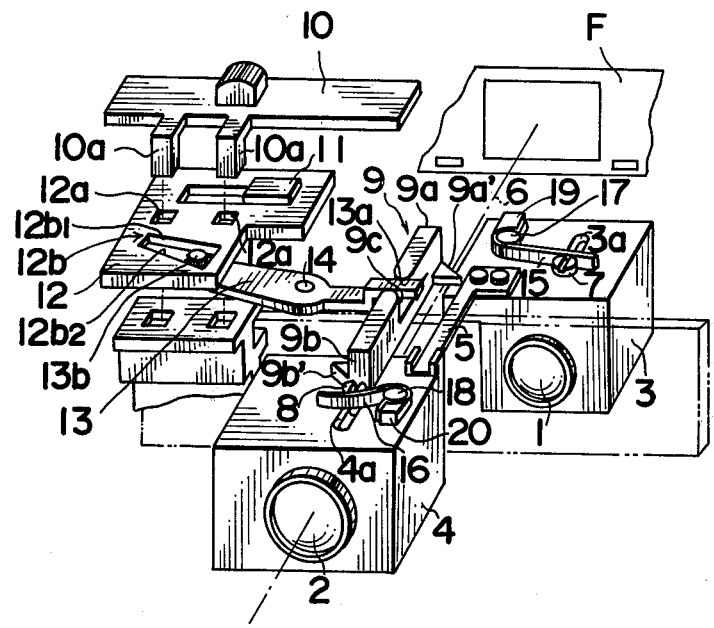
FIG. 2 is a view similar to that of FIG. 1 illustrating the positioning of the various elements when a telephoto lens is in the operative selected position having its longitudinal axis aligned with the optical axis of the camera, having been interchanged with the standard objective lens shown in FIG. 1.

Referring now in more detail to the accompanying drawings, FIGS. 1 and 2 illustrate a standard objective lens 1 and a telephoto objective lens 2 supported by holding frames 3 and 4 respectively in a camera for interchangeable positioning into alignment with the camera optical axis 6. Lenses 1 and 2 carried in the holding frames 3 and 4 are movable in a direction which is parallel with the plane of film F. A connector 5 is carried between holding frames 3 and 4 for coupling lenses 1 and 2 together so that when one of the lenses is moved, the other lens will also be moved. The longitudinal axes of lenses 1 and 2 are alternatively positioned in substantial alignment with optical axis 6 when they are moved by means of an externally operated member (not shown). Each of the lenses is carried in its respective holding frame so that they can be axially adjusted to effect focusing. Axial adjustment of the respective lenses is accomplished by movement of driven members 7 and 8 which are connected to lenses 1 and 2 respectively and which project through elongated slots 3a and 4a in holding frames 3 and 4 respectively. Accordingly, movement of the driven members 7 and 8 in their respective slots 3a and 4a will cause focusing adjustment of the lenses 1 and 2 respectively to a desired object distance.

A control member 9 is slidably carried in the camera for movement in a direction parallel to optical axis 6. A first control surface 9a is positioned at one end of the control member 9 for engagement with driven member 7 when lens 1 is in the selected operative position, i.e. when its axis is aligned with optical axis 6. A second control surface 9b is positioned at the other end of control member 9 for engaging driven member 8 when lens 2 has been moved into the selected operative position, i.e. when its axis is aligned with the optical axis 6 (see FIG. 2). Axial movement of control member 9 will vary the position of engagement of the control surfaces 9a and 9b with the driven member 7 and 8 respectively to vary focus adjustment of lenses 1 and 2. A distance setting member 10 is mounted in the camera for movement in a direction parallel with the direction of movement of film F. Legs 10a of distance setting member 10 are accommodated in holes 12a of a cam plate 12. Cam plate 12 is guided for movement by a guide projection 11. A cam window 12b is formed in the cam plate and has a first cam surface $12b_1$ on one side thereof and a second cam surface $12b_2$ on the other side thereof. Cam surface $12b_1$ is associated with focusing adjustment settings for lens 1 and when it is in the selected operative position and cam surface $12b_2$ is associated with focusing adjustment settings of lens 2 when it is in the selected operative position. An interlocking lever 13 is mounted for pivotal movement on a shaft 14. One end 13a of interlocking lever 13 is carried in a receiving portion 9c of control member 9 and the other end of lever 13 carries a pin 13b which extends into cam window 12b.

First and second control surfaces 9a and 9b of control member 9 each lie in a plane which is parallel with the direction of movement of the lenses 1 and 2 when they are moved between the operative position and the inoperative position. FIG. 1 illustrates the condition in which lens 1 is in the operative position and lens 2 is in the inoperative position. FIG. 2 illustrates the condition in which the lenses have been interchanged so that lens 2 is in the operative position and lens 1 is in the inoperative position. When the lenses are moved between the operative and inoperative positions, they move in a direction parallel to the direction of movement of film F and therefore parallel to the plane of control surfaces 9a and 9b. Driven member 7 is urged or biased by a spring 15 in a direction toward engagement with first control surface 9a when lens 1 is in the operative position. Driven member 8 is urged or biased by spring 16 into a direction for engagement with the second control surface 9b when lens 2 is in the operative position. Guide surfaces 9a' and 9b' are carried by the control member 9 adjacent control surfaces 9a and 9b respectively to help guide driven members 7 and 8 into smooth engagement with control surfaces 9a and 9b respectively when lenses 1 and 2 respectively are moved into the operative position. Springs 15 and 16 are of the flat or leaf type having one end thereof wound about projecting pins 17 and 18 respectively on holding frames 3 and 4 respectively and being fixed in place about the pins by stop members 19 and 20 respectively. The other free end of springs 15 and 16 engage driven member 7 and 8 to urge them in a direction toward the control surfaces 9a and 9b.

As noted above, FIG. 1 illustrates the condition in which standard lens 1 is in the operative position having its longitudinal axis aligned with the camera optical axis 6 and in which telephoto lens 2 is in the inoperative position having its longitudinal axis displaced from the optical axis 6. When lens 1 is moved into this position, driven member 7 is caused to engage and ride along guide surface 9a' until it comes into final engagement with control surface 9a. The force of driven member 7 caused by spring 15 against surface 9a urges control member 9 to move in an axial direction toward control surface 9b. This axial movement causes interlocking lever 13 to pivot in a clockwise direction about shaft 14 to cause pin 13b to engage against the first cam surface $12b_1$ of cam window 12 as seen in FIG. 1. Axial movement of lens 1 in its holding frame 3, caused by movement of driven member 7 by the biasing force of spring 15, is thus limited. Movement of the distance setting member 10 controls the position of cam plate 12. Accordingly, adjustment of distance setting member 10 will cause cam plate 12 to move thereby causing pin 13b to ride along cam surface $12b_1$ to cause pivoting of lever 13 and axial movement of control lever 9 to thereby readjust the focusing of lens 1.

As shown in FIG. 2, when standard lens 1 is displaced from the operative position, telephoto lens 2 will be moved into the operative position. Driven member 7 of lens 1 will disengage from control surface 9a and spring 15 will therefore cause driven member 7 to move to the fully extended position within slot 3a. Simultaneously, driven member 8 of lens 2 will engage and ride on guide surface 9b' to engage the second control surface 9b. Control surface 9b will thus push driven member 8 against the action of spring 16 into a preadjusting focusing setting. The action of spring 16 against driven member 8, however, will cause control member 9 to axially shift in a direction toward control surface 9a causing interlocking lever 13 to pivot in a counterclockwise direction as shown in FIG. 2, thus causing pin 13b to move into engagement with cam surface $12b_2$ of cam window 12b. Thus, when telephoto lens 2 is selected and moved into the operative position, axial positioning of control member 9 will be determined by cam surface 12b of cam plate 12. Accordingly, further movement of distance setting member 10 will result in consequent movement of cam plate 12 and shifting of control member 9 in a direction parallel to the optical axis of the camera to cause adjustment of driven member 8 in slot 4a to thereby cause further focusing adjustment of lens 2.

Focus adjustments of lenses 1 and 2 are carried out by only a single control member 9, and yet lenses 1 and 2 can each be controlled so as to be set for a focused condition on the same object distance by cam plate 12 being maintained in the same set position. To accomplish this, cam surfaces $12b_1$ and $12b_2$ are oriented in accordance with the focusing characteristics of lenses 1 and 2. Therefore, when it is desired to photograph the same object with both lenses, focusing adjustment can be made with either lens in the operative position and no further focusing adjustment is required when the lenses are interchanged. Accordingly, the same object can be quickly and easily photographed with the different lenses of the camera to produce photographs having different effects.

As noted above, first and second control surfaces 9a and 9b of the control member 9, which engage the driven members 7 and 8 for focusing adjustment of lenses 1 and 2 respectively, lie in a plane which is parallel to the direction of movement of the lenses when they are moved into and out of operative position. This permits precise focus adjustment of both of the lenses by control member 9 provided the driven members 7 and 8 are in contact engagement with the control surfaces 9a and 9b regardless of whether lenses 1 or 2 are accurately positioned along the optical axis 6 of the camera.

In the foregoing type of mechanism in which lenses 1 and 2 are carried in holding frames 3 and 4 for axial movement to produce focusing adjustment, driven members 7 and 8 may be directly connected with lenses 1 and 2. In another type of mechanism, however, in which lenses 1 and 2 are carried within holding frames 3 and 4 in such a manner that axial adjustment of the lenses is produced upon rotation of the lenses, driven members 7 and 8 may be connected to lenses 1 and 2 through a mechanism for converting the action of driven members 7 and 8 in a direction parallel to the optical axis into rotating movement of lenses 1 and 2.

Figure 3:
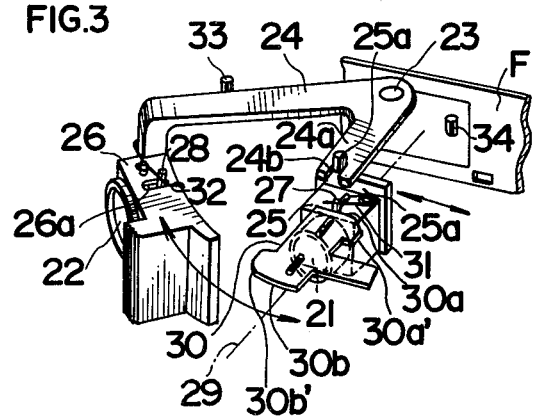
FIG. 3 is a perspective view of selected elements of the camera illustrating a second embodiment of the present invention.

Referring now to FIG. 3 which illustrates a second embodiment of the present invention, a holding frame 25 which carries a wide angle lens 21 is supported by the camera body so that it is movable in a direction parallel with the movement of film F. A telephoto lens 22 is carried by holding frame 26 mounted on one end of lever 24 which is mounted for pivotal movement about shaft 23, which is arranged in a direction vertical and transverse to the optical axis. Telephoto lens 22 is therefore movable in an arcuate path as lever 24 is pivoted about shaft 23. An auxiliary arm 24a of lever 24 is connected to holding frame 25 by a pin-and-slot connection consisting of slot 24b and a driven pin 25a. As lever 24 pivots about shaft 23, lenses 21 and 22 are each moved between the operative and inoperative positions so that their axes will become aligned with the camera optical axis 29. Each lens has an associated driven member 27 and 28, each of which projects through slots 25a and 26a of lens holding frames 25 and 26 respectively. Driven members 27 and 28 are urged or biased by springs 31 and 32 into engagement with first and second control surfaces 30a and 30b of a control member 30. First control surface 30a lies in a plane parallel to the plane of film F so that it is parallel to the direction of movement of lens 21. Second control surface 30b is formed in an arcuate plane which is parallel with the arcuate path of movement of driven member 28 associated with lens 22. Driven member 28 is therefore engageable with second control surface 30b when it is moved along an arcuate path into the operative position. Stops 33 and 34 serve to limit pivotal movement of lever 24 to thereby determine the angular position of lever 24 for proper positioning of the interchangeable lenses. Guide surfaces 30a' and 30b' serve to guide control member 30 into smooth engagement with driven members 27 and 28.

As with the previous embodiment, the advantage of this embodiment is that even if lenses 21 and 22 are not accurately positioned in the operative position, accurate focus adjustment is still possible by movement of control member 30 in a direction parallel to the optical axis. Lens 21 may be rotatably positioned into or out of the operative position and first control surface 30a may be coaxially formed with the path of movement of lens 21.

Figure 4:
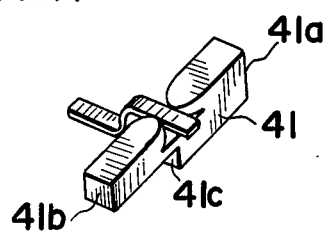
FIG. 4 is a perspective view of one of the elements of the present invention illustrating a third embodiment thereof.
Figure 5:
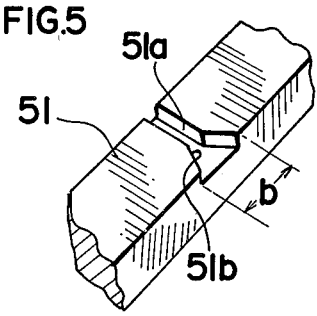
FIG. 5 is a view similar to that of FIG. 4 illustrating a fourth embodiment of the present invention.

The present invention therefore provides a control member for adjusting the position of the driven members associated with each of the interchangeable lenses, such control member having control surfaces which are parallel with the direction of movement of the lenses as they are moved into and out of the operative position. No special mechanisms are required to accommodate movement of the interchangeable lenses or the number of interchangeable lenses. Further, a plurality of lenses may be provided and their focusing adjustment can be made by a single control member or by separate control members. In a mechanism where a single control member is used for focusing adjustment of three different objective lenses, a control member 41, as illustrated in FIG. 4, may be used. This control member has a step control surface 41c, in addition to end control surfaces 41a and 41b. Alternatively, a control member 51, as illustrated in FIG. 5, may be used. This control member has a groove control surface 51a. When the groove control surface 51a, as illustrated in FIG. 5 is used, a triangular introduction portion 51b having an open end width b which is slightly wider than the maximum stroke of the control member is used to introduce the respective driven members of the interchangeable lenses. This enables introduction of the driven members into groove control surface 51a wherever the driven members may be positioned, thus requiring no driven members to be urged or biased. The triangular introduction portion is thus effective for use in the various embodiments of the present invention. In addition, the portion of the driven member of each lens intended to engage the control surface can be positioned to engage the same control surface by the provision of a pin projection.

As will be appreciated from the foregoing, the present invention provides a control member which is constructed to control the axial position of interchangeable selective lenses by engaging the driven members of such lenses as they are brought into operative position. This is accomplished by providing control surfaces on the control member which lie in planes parallel to the direction of movement of the lenses and of their respective driven members as they are moved into and out of the operative position in which the axis of the selected lens is aligned with the camera optical axis. Therefore, even if the predetermined positions of the movable lenses vary and the axis of the lens which is in the operative position is not always precisely aligned with the camera optical axis, the driven members will always be precisely controlled so long as there is engagement with the control surfaces of the control member. This construction greatly improves focusing adjustment accuracy, resulting in photographs of increased quality and desirability.

While the present invention has been described and illustrated with respect to certain embodiments which produce satisfactory results, it will be appreciated by those skilled in the art, after understanding the purposes of the invention, that various changes and modifications may be made without departing from the spirit and scope of the invention, and it is therefore intended to cover all such changes and modifications in the appended claims.

What is claimed is:

1. A self contained multiple interchangeable objective lens camera having a photographic optical axis, comprising:

first and second objective lenses movably carried within said camera for interchangeable alignment with said optical axis, each lens being movable between an operative photographic position when its longitudinal axis is substantially aligned with said optical axis of said camera and an inoperative position when its longitudinal axis is displaced from said camera optical axis;

means interconnected between said first and second objective lenses for causing displacement of either one of said objective lenses from said operative position to said inoperative position in response to movement of the other objective lens from said inoperative position to said operative position;

a first driven member associated with said first objective lens and a second driven member associated with said second objective lens for effecting focusing adjustment thereof;

an externally, manually movable distance setting member carried by said camera;

control means mounted in said camera for movement in response to movement of said distance setting member, first and second control portions carried by said control means, said first and second control portions being selectively engageable with said driven member of one of said first and second objective lenses that is positioned in said operative photographing position for controlling movement of said driven members to effect focusing adjustment of said lenses; and a first and second control surface respectively provided at either one of said first driven member and said first control portion and at either one of second drive member and said second control portion, each control surface lying in a plane parallel to the direction of movement of said driven members when said lenses are displaced between said operative and inoperative positions.

2. The camera according to claim 1, wherein said first and second control surfaces are carried on said first and second control portions respectively of said control means.

3. The camera according to claim 2, further comprising first biasing means for urging said first driven member into engagement with said first control surface when said first lens is in said operative position, and second biasing means for urging said second driven member into engagement with said second control surface when said second lens is in said operative position.

4. The camera according to claim 3, further comprising first and second guide surfaces associated with said first and second control surfaces of said first and second control portions to facilitate engagement of said first and second driven members with said first and second control surfaces respectively when said first and second lenses are moved into the operative position.

5. The camera according to claim 2, wherein said control means comprises a control member, said first and second control surfaces being formed as integral parts thereof.

6. The camera according to claim 5, further comprising a cam plate mounted in said camera for movement in response to movement of said distance setting member, first and second cam surfaces carried by said cam plate, and interlocking member coupled between said cam plate and said control member for causing movement of said control member in response to movement of said cam plate, said interlocking member being positionable between a first condition in which movement of said interlocking member is controlled by said first cam surface when said first lens is in the operative position and a second condition in which movement of said interlocking member is controlled by said second cam surface when said second lens is in the operative position, and means for interchanging the condition of said interlocking member when the positions of said lens are interchanged.

7. The camera according to claim 1, wherein said first and second objective lenses have different focal lengths.

8. The camera according to claim 1, wherein the direction of movement of said lenses between the operative and inoperative positions is parallel to the direction of movement of the film within said camera, and wherein said control surfaces of said control portions lie in planes parallel to the direction of movement of said film.

9. The camera according to claim 1, wherein at least one of said objective lenses is moved between the operative and inoperative positions along an arcuate path and wherein the control surface for said lens lies in a curved plane parallel to said path of movement of said lens.

10. The camera according to claim 1, wherein said objective lenses are carried for axial focusing adjustment on frame means, said driven members being connected with said objective lenses and extending through said frame means for engagement with said control surfaces.

11. A focus adjusting device in a camera having an optical axis, a plurality of interchangeable objective lenses, and means for selectively moving said lenses between an operative position in which the longitudinal axis of a selected lens is substantially aligned with said optical axis and an inoperative position in which the longitudinal axis of said lens is displaced from said optical axis, said device comprising a distance setting member movably carried on said camera, follower means coupled with each of said lenses for causing axial movement thereof for focusing adjustments, control means carried for movement within said camera in response to movement of said distance setting member, and a control surface coupled with said control means for movement in a direction parallel to said optical axis when said control means is moved in response to movement of said distance setting member so as to engage with a surface of said follower means of a selected lens when in the operative position to effect focusing adjustment thereof, at least one of said control and engaged follower surfaces lying in a plane parallel to the direction of movement of said follower means when a respective lens moves between its operative and inoperative position proximate said optical axis.

12. The focus adjusting device according to claim 11, further comprising means interconnecting said plurality of lenses so that when one of said lenses is moved to the operative position, the other of said lenses will be moved to the inoperative position.

13. The focus adjusting device according to claim 11, wherein said control means comprises a control member having a control portion for each of said plurality of lenses, said control surface being carried by each of said control portions for each of said lenses.

14. The focus adjusting device according to claim 13, wherein each of said control surfaces lie in a plane which extends transverse to said optical axis.

15. The focus adjusting device according to claim 14, further comprising a cam plate coupled between said distance setting member and said control member, and an interlocking member coupled between said cam plate and said control member for causing movement of said control member in response to movement of said cam plate, said interlocking member being positionable amongst a plurality of conditions for controlling focusing adjustment of said plurality of lenses respectively.

16. The focus adjusting device according to claim 15, further comprising a plurality of cam surfaces carried by said cam plate and follower means carried by said interlocking member, said follower means of said interlocking member being in engagement with said plurality of cam surfaces when said interlocking member is moved amongst said plurality of conditions.

17. The focus adjusting device according to claim 11, further comprising means for urging said follower means of a selected lens into engagement with said control surface when said selected lens is in the operative position.

18. The focus adjusting device according to claim 11, the distance setting member being manually operable.

19. A focus adjusting device in a camera having an optical axis, a plurality of interchangeable objective lenses, and means for selectively moving said lenses between an operative position in which the longitudinal axis of a selected lens is substantially aligned with said optical axis and an inoperative position in which the longitudinal axis of said lens is displaced from said optical axis, said device comprising a distance setting member movably carried on said camera, cam means coupled with said distance setting member and movable in response to the movement of said distance setting member, follower means coupled with each of said lenses for causing axial movement thereof for focus adjustments, control means movably carried within said camera, a control surface coupled with said control means for movement in a direction parallel to said optical axis in response to movement of said control means so as to engage with said follower means of a selected lens when in the operative position to effect focusing adjustment thereof, and interlocking means coupled between said cam means and said control means for causing movement of said control means in response to movement of said cam means, said interlocking means being positionable amongst a plurality of conditions for controlling focusing adjustment of said plurality of lenses respectively.

20. The focus adjusting device according to claim 19, wherein said control means comprises a control member having a control portion for each of said plurality of lenses, said control surface being carried by each of said control portions for each of said lenses.

21. The focus adjusting device according to claim 20, wherein each of said control surfaces lie in a plane which extends transverse to said optical axis and parallel to the direction of movement of said follower means at the time when said lenses are displaced between said operative and inoperative positions.

* * * * *

UNITED STATES PATENT AND TRADEMARK OFFICE
CERTIFICATE OF CORRECTION

PATENT NO.   :   4,204,760
DATED        :   May 27, 1980
INVENTOR(S)  :   Haruo Kobayashi It is certified that error appears in the above-identified patent and that said Letters Patent are hereby corrected as shown below:

[75]   Inventor:   HARUO KOBAYASHI, Toyokawa, Japan

Signed and Sealed this

Fifth Day of August 1980

[SEAL]

*Attest:*

SIDNEY A. DIAMOND

*Attesting Officer*    *Commissioner of Patents and Trademarks*